United States Patent
Bertin

(10) Patent No.: US 9,628,785 B2
(45) Date of Patent: Apr. 18, 2017

(54) METHOD OF COMMUNICATION AND ASSOCIATED SYSTEM OF GLASSES TYPE FOR A USER USING A VIEWING STATION

(75) Inventor: Marc Bertin, La Celle les Bordes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 512 days.

(21) Appl. No.: 13/611,074

(22) Filed: Sep. 12, 2012

(65) Prior Publication Data

US 2013/0070924 A1 Mar. 21, 2013

(30) Foreign Application Priority Data

Sep. 19, 2011 (FR) ...................... 11 58315

(51) Int. Cl.
*H04N 7/167* (2011.01)
*H04N 13/04* (2006.01)

(52) U.S. Cl.
CPC ..... *H04N 13/0497* (2013.01); *H04N 13/0438* (2013.01); *H04N 2013/0463* (2013.01); *H04N 2213/008* (2013.01)

(58) Field of Classification Search
CPC .. H04L 29/06176; H04L 29/06659–29/06687; H04L 29/06707–29/06748; H04L 29/06755–29/06816
USPC ..................... 380/211, 232, 277–286, 28–30
See application file for complete search history.

(56) References Cited

U.S. PATENT DOCUMENTS

| | | | |
|---|---|---|---|
| 6,695,207 B1* | 2/2004 | Norris, Jr. ............... | B60R 25/23 235/380 |
| 6,959,389 B1 | 10/2005 | Dunn et al. | |
| 8,430,310 B1* | 4/2013 | Ho ......................... | G06F 21/35 235/382 |
| 8,965,460 B1* | 2/2015 | Rao ........................ | G06F 3/005 455/566 |
| 2002/0101988 A1* | 8/2002 | Jones ...................... | G09C 5/00 380/54 |
| 2003/0165240 A1* | 9/2003 | Bantz ...................... | G09C 5/00 380/54 |
| 2007/0052672 A1* | 3/2007 | Ritter .................. | G06F 3/03547 345/156 |
| 2009/0129591 A1* | 5/2009 | Hayes ................... | G06F 21/608 380/51 |
| 2010/0110368 A1 | 5/2010 | Chaum | |
| 2010/0194857 A1 | 8/2010 | Mentz et al. | |

(Continued)

OTHER PUBLICATIONS

French Search Report dated Jan. 11, 2012, corresponding to the French Priority application No. 1158315.

*Primary Examiner* — Carl Colin
*Assistant Examiner* — Quy Pham
(74) *Attorney, Agent, or Firm* — Young & Thompson

(57) ABSTRACT

A method for communicating between a user using a viewing device (2000) and the viewing device, includes the following steps: acquiring, at an acquisition interface (1400) integrated into a pair of glasses (1000) of the user, an item of information on utilization of the glasses; and generating and sending to the viewing device (2000), by a microcontroller (1100) integrated into the glasses, a data signal (DATA) depending on the acquired information. The acquired information enables in particular the authentication of the user, so as to send, to the viewing device, data that the latter will use to display a digital content.

6 Claims, 2 Drawing Sheets

(56) References Cited

U.S. PATENT DOCUMENTS

2010/0278344 A1* 11/2010 Rhelimi .............. H04N 7/1675
  380/277
2012/0229250 A1* 9/2012 Lim ..................... G06F 21/84
  340/5.8

* cited by examiner

METHOD OF COMMUNICATION AND ASSOCIATED SYSTEM OF GLASSES TYPE FOR A USER USING A VIEWING STATION

BACKGROUND OF THE INVENTION

Field of the Invention

The present invention concerns a method of communication and an associated system of glasses type for a user using a viewing station. The invention has a particular application in the communication between 3D glasses and a corresponding 3D display screen.

Those having glasses often use them to look at a viewing station, such as a television or a cinema screen. These glasses may be corrective glasses to correct defects in the user's eyes. They may also be specific to the viewing station used, giving additional functions. Such is the case for the recent 3D glasses which give a 3D relief effect in conjunction with an associated 3D screen.

Description of the Related Art

Active 3D glasses exist today, for example in accordance with the XPanD 3D (trade name) technology, whereby the 3D effect is obtained by rapid and successive obturations of each eye, synchronized with the 3D images displayed on a 3D television or 3D cinema screen. That synchronization is provided using an infrared synchronization signal sent to the glasses by the source of the images displayed, as described for example in the publication US 2010/194857.

Generally speaking, the use of glasses is closely linked to the visual nature of the viewing stations. It is thus desirable to take advantage of this situation to improve the use of viewing stations, such as a television.

BRIEF SUMMARY OF THE INVENTION

To that end, the present invention concerns in particular a method for communicating between a user using a viewing device and said viewing device, comprising the following steps:

acquiring, at an acquisition interface integrated into a pair of glasses of the user, an item of information on utilization of the glasses, generating and sending to the viewing device, by a microcontroller integrated into the glasses, a data signal depending on the acquired information.

The invention makes it possible to take advantage of the glasses used in the context of a viewing action, as a data source favorable to the operation of the viewing device. This is made possible, according to the invention, by the acquiring of an item of information at an acquisition interface enabling evaluation of an external utilization environment and by the sending of a signal which derives therefrom to said viewing device.

To be precise, glasses constitute a device that is fully complementary to a viewing device, and on that basis, may be used effectively for providing data to said viewing device.

As described below, the acquisition interface enables detection of an item of information relative to an external environment, such as the fact of using the glasses that is detected by an appropriate sensor or such as the identity of the user for the purposes of sending data which may be personalized. The sending may be performed by conventional communication techniques, and advantageously by wireless communication of radio type (in accordance with the standard Zigbee or Bluetooth—trade names) or infrared.

The current miniaturization techniques, for example via secure modules or chip cards, enabling solutions to be provided for integrating components, such as an acquisition interface, a microcontroller and/or a communication interface, within a glasses structure (for example in the arms and/or the frame of the glasses).

In an embodiment of the invention, the acquired information on utilization of the glasses is information for authentication of the user. Various embodiments are provided as described below, ranging from the acquiring of biometric data to the input of a confidential code (for example a PIN code, PIN standing for Personal Identification Number). This configuration enables personalized operations to be carried out and thus to send to the viewing device, by the user's glasses, data that are also personalized.

In particular, the acquired authentication information is an item of biometric information acquired with the use of at least one sensor integrated into the glasses. On account of their position on the user and/or their manipulation, glasses constitute an effective means for acquiring biometric data from the user without seeking the user's involvement: detection of a finger print during manipulation of the arms, detection of an angle of inclination of the head specific to the user or biometric data representing characteristics of the user's head (iris, retina, image of the face, size and shape of the head deduced from the deformation of the arms, etc.) during use of the glasses.

In an embodiment, the method further comprises the authentication of the user at the microcontroller integrated into the glasses and on the basis of the acquired authentication information, before sending said data signal to the viewing device only in case of successful authentication. Thus, the sending of data (for example a second item of information stored in memory) to the viewing device is dependent upon the authentication of the glasses wearer.

According to variant embodiments, the data signal generated and sent is of varied nature. In particular, the viewing device advantageously takes into account the data of the signal generated and sent to render a content on a display screen.

Thus, according to a first embodiment, the data signal generated and sent comprises at least one cryptographic key for deciphering a digital content to display on the viewing device.

This provision enables the user to use his glasses to store a deciphering key which is generally specific to him. This information is for example stored in memory of a secure module.

In a configuration as a variant, it may be provided for the method to comprise, situated at the microcontroller of the glasses, the following steps:

obtaining an encrypted digital content;

obtaining a decryption key from the acquired information;

decrypting the encrypted digital content using the decryption key;

and in which method the data signal sent to the viewing device comprises the digital content so decrypted.

The glasses are thus provided as means for decrypting the data to view, which may be stored locally in a memory integrated into the glasses or be received from an external device. In particular, obtaining the encrypted digital content may comprise reception, by a communication interface integrated into the glasses, of an encrypted digital content sent by the viewing device.

The glasses may thus constitute a personal decryption means which the user can carry and use in any location.

The use of the glasses for such decryption may furthermore be dependent upon the actual use of the glasses by the user. In this context, the continuous decryption of the encrypted digital content using the decryption key and the continuous sending of the decrypted content to the viewing device are dependent upon continuous detection, by at least one sensor integrated into the glasses, of the wearing of the glasses by said user. In other words, if the wearing of the glasses is interrupted, the decryption and the sending are also interrupted. This provision makes the use of the glasses secure when they comprise a decryption key, which is generally personal.

The continuous detection may in particular comprise the continuous authentication (by analysis of the iris, the retina, the image of the face, etc) of the user to whom the decryption key used is personal According to another embodiment, the data signal generated and sent comprises configuration data to configure (for example an audio and/or display rendering) the viewing device. It comprises personal preferences (volume, preferred channels or languages, default parameters, etc.). To be precise, as the glasses are personal objects, they may be used advantageously for personalization purposes. In particular, the configuration data belong to a profile specific to the user and obtained using said acquired information (generally an item of identification data, whether or not biometric).

According to still another embodiment, the data signal generated and sent comprises data to display by said viewing device. By way of example, this may be menus, for example personalized according to the user or specific to the functions linked to the presence of glasses (enlargement, 3D function for 3D glasses).

According to still another embodiment, the data signal generated and sent comprises a command signal of the viewing device. In this configuration, the glasses may be used as a remote controller of said viewing device, for example by detection of the movements of the head or eyes of the user.

According to a particular application of the invention, the viewing device comprises a 3D display screen and the glasses are 3D glasses for viewing a 3D image on said screen. As a matter of fact, in that case, the presence of the glasses is generally indispensable to fully take advantage of the possibilities of the display screen. Thus, it is desirable to take advantage of that presence to use the glasses as a data source for that screen.

In a complementary manner, the invention also concerns glasses for a user using a viewing device, integrating:
 an acquisition interface configured to acquire an item of information on utilization of the glasses.
 a microcontroller to generate and control the sending, to the viewing device, of a data signal according to the acquired information.

The glasses have similar advantages to those of the communication method set out above.

Optionally, the glasses may comprise means relating to the features of the communication method set out above.

BRIEF DESCRIPTION OF THE DRAWINGS

Still other particularities and advantages of the invention will appear in the following description, illustrated by the accompanying drawings, in which.

FIG. 1 is a diagram of glasses 1000 of a user and of a viewing device 2000, for example a television, a computer or a tablet computer.

DETAILED DESCRIPTION OF THE PREFERRED EMBODIMENTS

Figure 1:
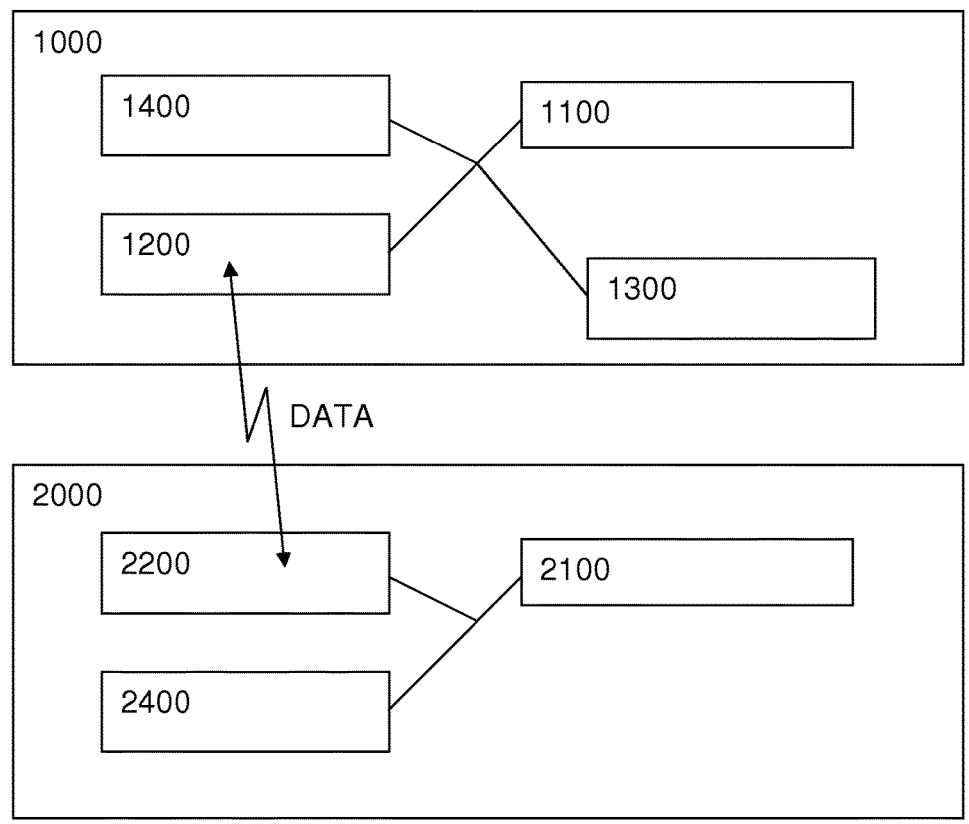
FIG. 1 is a diagram of the glasses and a viewing device according to the invention.

The glasses 1000 may be conventional spectacles which the user wears when looking at a content on the viewing device 2000. When the latter is designed to display contents in three dimensions (3D), the glasses 1000 may be of the 3D glasses type well-known to the person skilled in the art.

The drawing shows electronic components integrated into the glasses 1000, for example according to the same mechanisms of integration as those utilized for the production of so-called active 3D glasses. These electronic components are in particular integrated into the frame of the glasses 1000, for example at the location of the arms, of the frame rims surrounding the lenses or of the bridge linking those rims. As a variant, they are added to a printed circuit of small size (for example a chip card) physically linked to the glasses.

In an embodiment, all or some of these components are integrated into a secure microcircuit module (or chip card in accordance with the ISO7816 standard).

The glasses 1000 thus integrate a microcontroller 1100, a communication module 1200 with the viewing device 2000, a memory 1300, as well as an acquisition interface 1400 designed to acquire an item of information on utilization of the glasses.

The microcontroller 1100 is advantageously rendered secure, that is to say in conformity with the common criterion or with the FIPS standard (FIPS standing for Federal Information Processing Standards).

The nature of the communication module 1200 may be divers as will be apparent from the examples of application of the invention below. For example, the communication module 1200 is a transmitter-receiver of radiofrequency type in particular according to one of the protocols Zigbee, Bluetooth, IEEE standard 802.15.1, or of infrared type.

The communication module 1200 enables the sending of a data signal generated at the glasses in accordance with the invention. In certain applications, the communication module 1200 also enables the reception of data from an external source, including the viewing device 2000, in which case bi-directional communication with the viewing device 2000 is implemented.

In an embodiment, this communication module 1200 implements communications that are rendered secure using cryptographic means, for example by signature or encryption/decryption. In this case, encryption/decryption algorithms and corresponding keys are provided in the microcontrollers integrated in the glasses and present in the external equipment (in particular the viewing device 2000).

The memory 1300 is a storage memory, of read only memory or flash memory type. According to the invention, it preferably comprises at least one item of information from which the data signal to send to the viewing device 2000 is generated. As illustrated in the examples below, the nature of this information may be diverse: cryptographic key, digital content, system or user preferences, etc.

The acquisition interface 1400 is an input-output interface preferably constituted by at least one sensor enabling the acquisition of an item of information on utilization of the glasses. It may, in particular be a man-machine interface by which the user specifies an item of identification or authentication data (a PIN code input on a keyboard, an item of biometric data acquired by appropriate sensors, for example). Various examples of applications are described below.

According to the invention, such information acquired by the acquisition interface 1400 is used to generate, by the microcontroller 1100, a data signal DATA intended for the viewing device 2000, television or tablet computer, for example.

In a particular embodiment, the acquisition interface 1400 may furthermore comprise a button and/or a keyboard enabling the user to confirm or inhibit the sending of the data signal DATA to the viewing device 2000.

The viewing device 2000 comprises, in addition to a microcontroller 2100, a communication module 2200 corresponding to that 1200 of the glasses 1000, to receive that data signal DATA. This communication module 2200 thus enables communication with several glasses of several users, and possibly with other external devices.

Lastly, on account of its visual nature, the viewing device 2000 also comprises a screen 2400 to display a digital content. The digital content or its rendering may in particular depend on the data signal DATA received as will become apparent in more detail from examples below.

In a first general example of the invention implementing an authentication of the user of the glasses 1000, the latter inputs authentication (or "identification") data AU using the acquisition interface 1400. These data AU are sent to the microcontroller 1100 which compares them to reference authentication data RA stored in the memory 1300.

This comparison constitutes an operation of authentication of the user. If the data AU and RA match (successful authentication), the microcontroller 1100 retrieves data DATA stored in the memory 1300 and sends them to the viewing device 2000 via the radio communication module 1200.

On reception of those data DATA, the viewing device 2000 commands the display and the rendering of a digital content on the display 2400 according to those data DATA.

For the acquisition of the authentication data AU, the acquisition interface 1400 may be constituted by biometric or similar sensors, or by an input interface such as a miniature digital or alphanumeric keyboard, or by a contact free communication interface.

Using a miniature keyboard, the user may thus input a PIN code as authentication data. The authentication then consists in comparing that PIN code with a pre-recorded reference PIN code.

As regards the contact free communication interface, typically in accordance with the ISO/IEC 14443 standard or according to the NFC protocol (NFC standing for Near Field Communication), equipping a chip card integrated into the glasses 1000, the user of the glasses may be the wearer (in a pocket) of an external chip card reader according to that standard enabling the sending of an item of authentication information AU from the reader to the interface 1400 (it being possible for that information AU to be stored in memory of the reader or to be input by the user on the external reader). The user thus performs contact free self-authentication.

Lastly, using a biometric sensor, the user may input an item of biometric authentication information such as for example a finger print (set of minutiae representing said finger print).

Preferably, the biometric sensor may be disposed such that no deliberate action of the user is required. For example, the finger print sensor may be provided on the arms of the glasses such that by manipulating them (while opening them, for example), a finger print of the user is acquired.

Another example of biometric information may be the angle of inclination of the glasses relative to the horizontal. As a matter of fact, this angle is characteristic of the user without any specific action by the user. When the acquisition interface 1400 is constituted by a sensor, the appropriate sensor is in this case an inclinometer, for example of MEMS form (MEMS standing for Microelectromechanical systems).

The biometric information may as a variant represent at least one characteristic of the user's head. This information may then be acquired by the sensor or sensors, constituting the acquisition interface 1400, during wearing of the glasses.

In a first example, the biometric information represents dimensions of the head at the location of the glasses. Sensors of stress or deformation gauge type, constituting the aquisition interface 1400, may be provided in the arms of the glasses (one sensor per arm, or a plurality of sensors distributed along each arm for greater precision in the evaluation of the deformation) so as to obtain a value representing the spread of the arms and thus the dimensions of the head at the location of the glasses worn.

In another example, the biometric information is an image of the face to compare with a pre-recorded image RA. In particular, that image may be a view from above of the face acquired by a camera, constituting the acquisition interface 1400, situated for example on the bridge of the glasses 1000, as illustrated diagrammatically in FIG. 2.

In a variant also using a camera, constituting the acquisition interface 1400, this time situated on the edge of the frame rims, the biometric information may be an image of the iris of the user acquired by that camera when the user gazes towards it, for example on being instructed by a message displayed on the screen 2400 of the viewing device 2000.

The acquisition of an item of biometric information (for example the iris, the face, a dimension of the head, etc.) of the user without deliberate aid by the user has the advantage of being able to implement, within the microcontroller 1100, a continuous verification or "continuous authentication" of the wearer of the glasses. The sending of data may for example be dependent over time on this continuous authentication, the sending of data also varying over time: as soon as the authentication is no longer obtained (the user removes the glasses for example), the sending of the data in course is interrupted, until the user once again wears the glasses. This configuration notably increases the security in the sending of highly personalized data.

As referred to previously, the very nature of the data DATA according to the invention may vary appreciably according to different applications.

According to one configuration, those data, initially stored in the memory 1300, are extracted therefrom in case of positive authentication, and then sent to the viewing device 2000. When those data are personalized, the invention enables the user to carry them with him (for example configuration parameters as described below) and to use any viewing device with those personalized data.

According to one application, those data are elements of an interactive menu. Thus, when the user wears glasses, they send those elements of interactive menu, after authentication, to the device 2000, it thus being possible for them to be personalized according to the user. Next an interactive menu with all or some of those elements is displayed to the user on the screen 2400, which user browses in the menu in a conventional manner using a remote controller of the device 2000.

In rather similar manner, those data may be data complementary to a program in course of display on the screen 2400. By way of illustration, this may be a translation of the audio track in the language of the user of the glasses, or explanations or comments (in text or audio form) of the program displayed.

According to another application, those data sent after authentication are configuration or preferences information, which may be personal to the user, for example the volume of sound to apply by the device 2000, a channel to start on turning on the device 2000, rendering parameters such as the luminosity or the contrast or the display format (16/9, 4/3; 2D or 3D image, etc.). In the presence of the glasses and possibly in case of successful authentication, the viewing device 2000 then operates according to that configuration information.

According to still another application, those data may comprise an item of information to authorize or not to authorize the reproduction and rendering of a digital content by the device 2000. For example, this may be a cryptographic key provided to decrypt an encrypted digital stream by a tuner of the device 2000. Thus, in the presence of the glasses and a successful authentication, the cryptographic key is sent to the device 2000 which may then decrypt the digital stream and display its content (in other words, this makes it possible in particular to decode encrypted channels in secure manner). The authentication beforehand of the user thus ensures a secure use of the cryptographic key to decode the digital stream.

According to still another application, those data initially stored in the memory 1300 may be a digital content to display on the screen 2400, for example photographs or a video sequence. Preferably, in this case, a memory card will be used, for example of microSD type (SD standing for Secure Digital). Thus, the device 2000 receives, directly from the glasses, a digital content to display.

According to still another application, the glasses may be used as a remote controller for the viewing device 2000. In this case, the data initially stored in the memory 1300 are command signals compatible with the device 2000.

By way of illustration, the sensor, constituting the acquisition interface 1400, may be of motion sensor type (accelerometer or inclinometer in particular) enabling a movement or a position of the user's head to be detected. On detection of such a movement, an associated command signal is sent to the viewing device 2000 in order, for example, to modify its display.

For example, if the sensor, constituting the acquisition interface 1400, detects that a user is lying down, the image displayed by 2400 may be turned through 90°.

According to another example, if the sensor, constituting the acquisition interface 1400, detects a "no" movement of the head, a signal commanding the viewing device 2000 to be turned off may be sent.

It is to be noted that if several users of the same device 2000 each wear glasses according to the invention, on reception of such a command signal the device 2000 may display a message requested the other users to validate that signal or not. Each user may then vote by making either a similar head movement (which sends the same command signal) or an opposite head movement. A voting rule (unanimity or majority) enables the device 2000 to determine, ultimately, whether or not the received command signal must be executed.

According to still another application, those data initially stored in the memory 1300 may comprise an item of synchronization information (for example a frequency) specific to the user. For example, it may be a speed of obturation of each eye for active 3D glasses, that is adapted to the eyes of the user. In this case, the synchronization information is sent to the 3D viewing device 2000, which, on reception thereof, adapts the display speed of the images and thus of synchronization of the obturations according to that synchronization information.

According to another configuration, the data DATA sent are not initially stored in the memory 1300. They are the result of processing by the microcontroller, for example on the basis of an item of information stored in the memory 1300. Once again, this processing generating the data DATA or else the sending thereof to the device 2000, may depend on the authentication of the user as described earlier.

According to an application, the glasses 1000 store a cryptographic key at 1300 and the microcontroller 1100, in case of successful authentication of the user, uses it to decrypt (using conventional mechanisms) an encrypted digital content received from an external source (for example from the viewing device 2000 using the bi-directional communication 1200-2200). A decrypted digital content DATA is thus obtained, which is then sent to the viewing device 2000.

The digital content may be a multimedia content such as a game, a film, or an access to a home automation service.

In the preceding examples, the data DATA sent are directly used by the viewing device 2000 to display a digital content: the data DATA either directly form all or part of the digital content to display, or data (cryptographic key) authorize the rendering of such a content, or configuration information affecting for example the rendering or affecting display parameters of the device 2000.

According to a variant however, the device 2000 may play the simple role of router of the data DATA to another item of equipment, for example the glasses of another user, a mobile telephone or a decoder (a DTT receiver for example). In this configuration, that other item of equipment integrates a function not present in the device 2000 and which is necessary for the processing of the data DATA before for example display on the device 2000. Thus, those data are routed to that item of equipment, which processes them and may send them to the viewing device for display.

For example, the glasses 1000 of the user comprise a data reception interface (radio interface), for example for receiving telephone calls or a DTT signal.

When that other item of equipment is of mobile telephone type, the call signal information or even the telephone conversation itself are sent from the glasses 1000 to the mobile telephone via the device 2000, the latter reproducing the call: display on the screen of the information of the communication in course (caller number, length, call signal, etc.) and audio rendering of the telephone conversation.

When the other item of equipment is a DTT decoder, an encoded DTT signal received by the glasses is sent to the DTT decoder via the device 2000 for decoding. The decoded DTT stream is sent back by the decoder to the device 2000 for display on the screen 2400.

Figure 3:
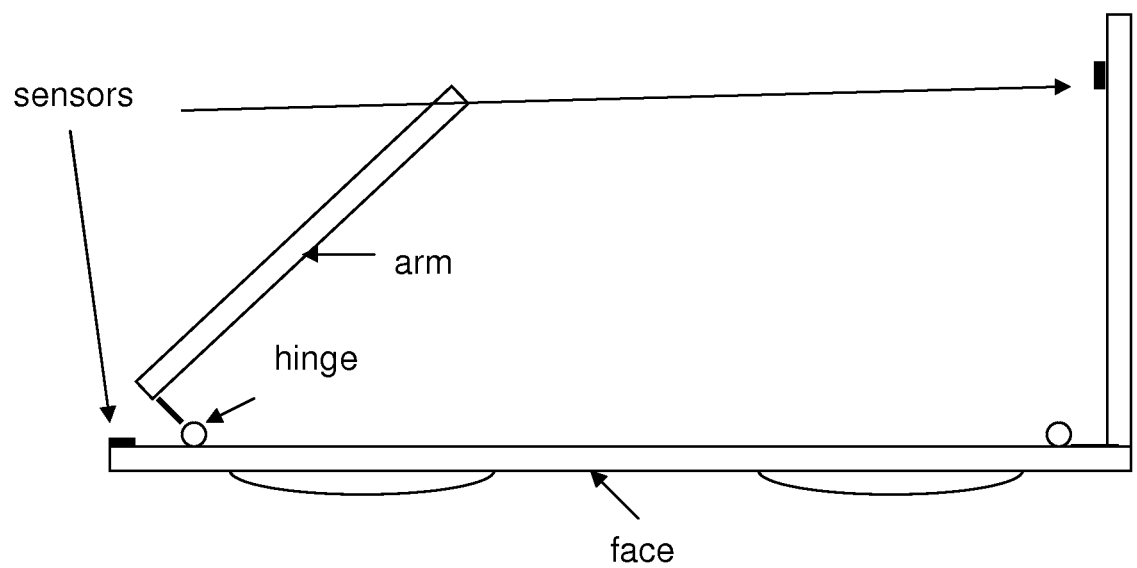
FIG. 3 illustrates another example of a user sensor of the glasses according to the invention.

In a variant of the first general example of the invention, no authentication data is acquired, but merely an item of information on utilization of the glasses. With reference to FIG. 3, the acquisition interface 1400 comprises a sensor configured to detect the opening and the closing of the arms of the glasses. By way of example, it may be a sensor of the position of the hinges between the arms and the frame rims of the glasses, or a detector of the presence of a head in close proximity to the glasses.

In the example in the Figure, they are simple mechanical or capacitive buttons making it possible to know whether the glasses are in course of use (arms open) or not (arms closed).

Depending on that information on utilization of the glasses acquired by the sensor, constituting the acquisition interface 1400, the glasses send a command signal DATA either for switching on the viewing device 2000 (in case of open glasses) or for turning off that device or putting it on standby (in case of closed glasses or the absence of a head in proximity to the glasses, that is to say when the user is not wearing the glasses).

Figure 2:
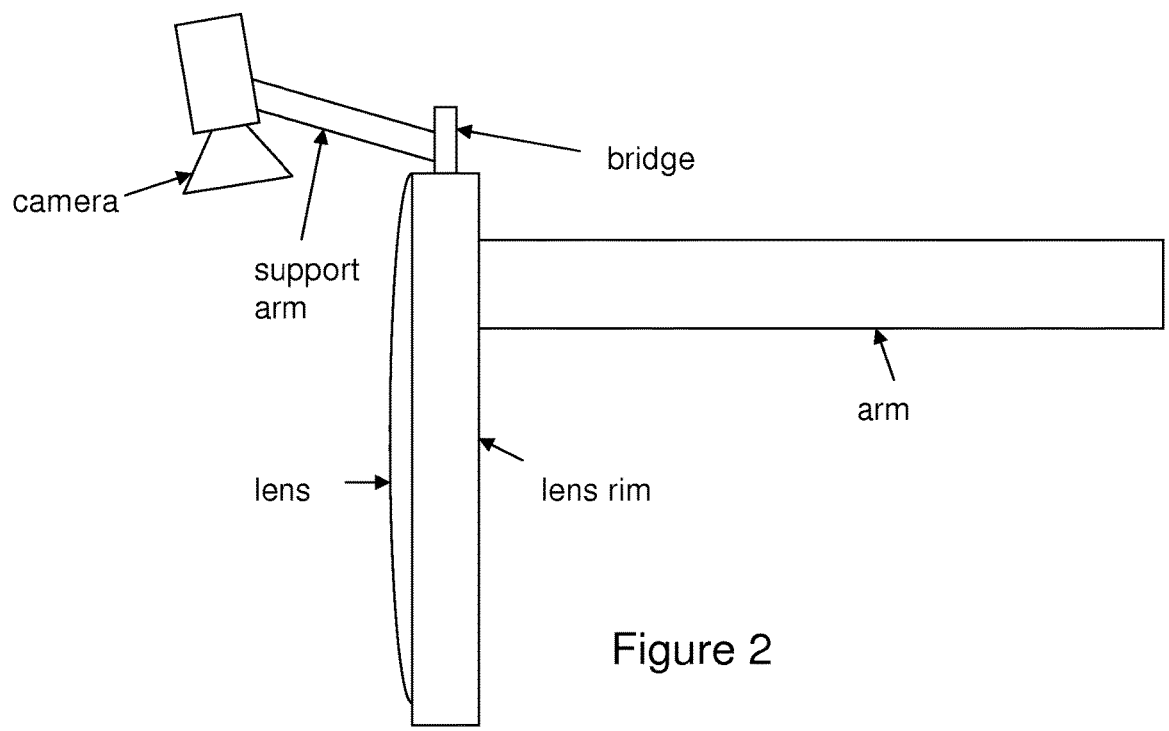
FIG. 2 illustrates an example of a biometric information sensor for an implementation of the invention.

In these different examples of FIGS. 1 to 3, the viewing device 2000 is an item of equipment physically distinct from the glasses 1000 of the invention. It may in particular be a television, a computer or a tablet computer.

The explanations and mechanisms described above may also apply to a configuration in which the viewing device 2000 forms an integral part of the glasses 1000. In particular, those two entities may have at their disposal communication interfaces 1200 and 2200 described earlier to communicate with each other, wirelessly or possibly by wired connection.

Google's "Project Glass" (trade names) for example provides a technical solution for a viewing device mounted on glasses.

The preceding examples are only embodiments of the invention which is not limited thereto.

The invention claimed is:

1. A method for communicating between a user using a viewing device and the viewing device, comprising the following steps:
    acquiring, at an acquisition interface integrated into a pair of 3D glasses for the user viewing a 3D image, an item of information on utilization of the pair of 3D glasses; and
    using a microcontroller integrated into the pair of 3D glasses,
        generating a data signal depending on the acquired information,
        obtaining an encrypted digital content,
        making an authentication of the user of the 3D glasses based on the acquired information using the acquisition interface integrated into the pair of 3D glasses,
        obtaining a decryption key stored in a memory of the pair of 3D glasses upon successful authentication of the user on the pair of 3D glasses based on the acquired information,
        decrypting the encrypted digital content using the decryption key, and
        sending the data signal to the viewing device, the sent data signal comprising the decrypted digital content,
    wherein the viewing device comprises a 3D display screen that displays the decrypted digital content, and
    wherein the viewing device and the pair of 3D glasses are distinct items of equipment,
    wherein obtaining the encrypted digital content comprises reception, by a communication interface integrated into the pair of 3D glasses, of the encrypted digital content sent by the viewing device, and
    wherein continuous decryption of the encrypted digital content using the decryption key and continuous sending of the decrypted content to the viewing device are dependent upon repeated continuous detection, by at least one sensor integrated into the pair of 3D glasses, of the wearing of the pair of 3D glasses by the user.

2. The method of claim 1, wherein the acquired authentication information is an item of biometric information acquired using at least one sensor integrated into the pair of 3D glasses.

3. The method of claim 1, wherein the data signal is sent to the viewing device only upon a successful authentication of the user.

4. A pair of 3D glasses in combination with a separate viewing device,
    the pair of 3D glasses comprising
    at an integrated acquisition interface that acquires an item of information on utilization of the pair of 3D glasses, and
    an integrated microcontroller that i) generates a data signal dependent on the acquired information, ii) obtains an encrypted digital content, iii) makes an authentication of a user of the 3D glasses based on the acquired information using the acquisition interface integrated into the pair of 3D glasses, and, after successful authentication of a user on the pair of 3D glasses based on the acquired information, obtains a decryption key stored in a memory of the pair of 3D glasses, iv) decrypts the encrypted digital content using the decryption key, and v) sends the data signal to the viewing device, the sent data signal comprising the decrypted digital content; and
    the viewing device comprising a 3D display screen that displays the decrypted digital content,
    wherein the viewing device and the pair of 3D glasses are distinct items of equipment,
    wherein obtaining the encrypted digital content comprises reception, by a communication interface integrated into the pair of 3D glasses, of the encrypted digital content sent by the viewing device, and
    wherein continuous decryption of the encrypted digital content using the decryption key and continuous sending of the decrypted content to the viewing device are dependent upon repeated continuous detection, by at least one sensor integrated into the pair of 3D glasses, of the wearing of the glasses by the user.

5. The pair of 3D glasses in combination with the separate viewing device of claim 4, wherein the acquired authentication information is an item of biometric information acquired using at least one sensor integrated into the pair of 3D glasses.

6. The pair of 3D glasses in combination with the separate viewing device of claim 4, wherein, wherein the data signal is sent to the viewing device only upon a successful authentication of the user.

* * * * *